(12) United States Patent
Choi et al.

(10) Patent No.: US 8,211,588 B2
(45) Date of Patent: Jul. 3, 2012

(54) SULFONATED POLY(ARYLENE SULFONE), CROSSLINKED MATERIAL THEREOF, CLAY NANOCOMPOSITE INCLUDING THE SAME, AND FUEL CELL INCLUDING THE SAME

(75) Inventors: Yeong-suk Choi, Suwon-si (KR); Sang-ouk Kim, Daejeon (KR); Sun-hwa Lee, Daejeon (KR); Won-jun Lee, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 287 days.

(21) Appl. No.: 12/651,599

(22) Filed: Jan. 4, 2010

(65) Prior Publication Data

US 2010/0183946 A1    Jul. 22, 2010

(30) Foreign Application Priority Data

Jan. 20, 2009   (KR) ........................ 10-2009-0004647

(51) Int. Cl.
*C07C 39/16* (2006.01)
*C08J 5/20* (2006.01)

(52) U.S. Cl. .......... 429/491; 568/723; 521/25; 429/492; 528/171; 525/534; 525/390; 525/419; 524/445

(58) Field of Classification Search ................. 429/491, 429/492; 568/723; 524/445; 525/534, 390, 525/419; 528/171; 521/25
See application file for complete search history.

(56) References Cited

FOREIGN PATENT DOCUMENTS
JP          9-245818       9/1997

*Primary Examiner* — Robert D. Harlan
(74) *Attorney, Agent, or Firm* — Stein McEwen, LLP

(57) ABSTRACT

A sulfonated poly(arylene sulfone) contains an unsaturated bond. A cross-linked material may be formed from the sulfonated poly(arylene sulfone), and a clay nanocomposite may include the sulfonated poly(arylene sulfone) or the cross-linked material. A fuel cell includes the clay nanocomposite.

22 Claims, 7 Drawing Sheets

SULFONATED POLY(ARYLENE SULFONE), CROSSLINKED MATERIAL THEREOF, CLAY NANOCOMPOSITE INCLUDING THE SAME, AND FUEL CELL INCLUDING THE SAME

CROSS-REFERENCE TO RELATED APPLICATIONS

This application claims the benefit of Korean Patent Application No. 10-2009-0004647, filed on Jan. 20, 2009, in the Korean Intellectual Property Office, the disclosure of which is incorporated herein in its entirety by reference.

BACKGROUND OF THE INVENTION

1. Field of the Invention

One or more embodiments relate to sulfonated poly (arylene sulfone), a cross-linked material thereof, a clay nanocomposite including the same, and a fuel cell including the same.

2. Description of the Related Art

Fuel cells may be classified according to the kind of electrolyte used. For example, fuel cells may be classified as polymer electrolyte membrane fuel cells (PEMFCs), phosphoric acid fuel cells, molten carbonate electrolyte fuel cells, and solid oxide fuel cells.

A PEMFC includes an anode, a cathode, and a polymer electrolyte membrane disposed therebetween. The anode includes a catalyst layer that promotes oxidation of a fuel, and the cathode includes a catalyst layer that promotes reduction of an oxidizer.

The polymer electrolyte membrane of the PEMFC functions not only as an ion conductor for the movement of protons from the anode towards the cathode, but also as a separation layer preventing mechanical contact between the anode and the cathode. Thus, it is desirable for the polymer electrolyte membrane to have excellent ion conductance, electrochemical stability, high mechanical strength, high heat resistance, and film formation properties.

As disclosed in Japanese Patent Laid-Open Publication No. 9-245818, an example of a material used to form a polymer electrolyte membrane is sulfonated polysulfone. However, the mechanical strength of this material is typically less than desired for functioning as a polymer electrolyte membrane.

SUMMARY OF THE INVENTION

One or more embodiments include sulfonated poly (arylene sulfone) having an excellent glass transition temperature and solubility resistance, a cross-linked material of the sulfonated poly(arylene sulfone), a clay nanocomposite including the same, and a fuel cell including the same.

Additional aspects will be set forth in part in the description which follows and, in part, will be apparent from the description, or may be learned by practice of the presented embodiments.

One or more embodiments may include a sulfonated poly (arylene sulfone) including a first repeating unit represented by Formula 1A below, a second repeating unit represented by Formula 1B below, a third repeating unit represented by Formula 1C below, and a fourth repeating unit represented by Formula 1D below:

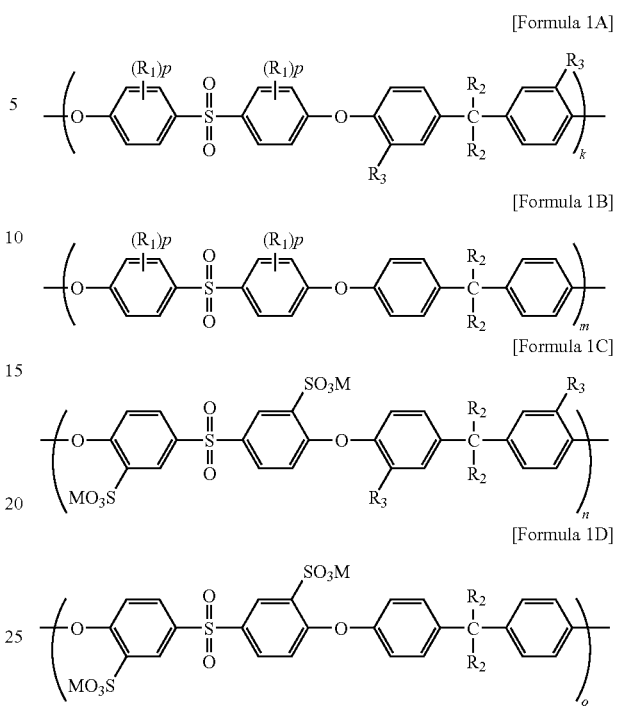

where the $R_1$s may be the same as or different from each other, and may be a $C_1$-$C_{10}$ alkyl group, a $C_2$-$C_{10}$ alkenyl group, a phenyl group, or a nitro group, p may be an integer in the range of 0 to 4, $R_2$ may be hydrogen, a methyl group or an ethyl group, $R_3$ may be a $C_2$-$C_{10}$ alkenyl group, M may be Na, K, or H, and k may be in the range of about 0.1 to about 0.9 mole, m may be in the range of about 0.1 to about 0.9 mole, and the sum of n and o may be in the range of about 0.1 to about 0.5 mole.

One or more embodiments may include a cross-linked sulfonated poly(arylene sulfone).

One or more embodiments may include a sulfonated poly (arylene sulfone) nanocomposite including the sulfonated poly(arylene sulfone) or the cross-linked sulfonated poly (arylene sulfone), and an unmodified clay.

One or more embodiments may include a fuel cell including a cathode, an anode, and an electrolyte membrane interposed between the cathode and the anode, wherein the electrolyte membrane may include the sulfonated poly(arylene sulfone) or the cross-linked sulfonated poly(arylene sulfone).

One or more embodiments may include a fuel cell including a cathode, an anode, and an electrolyte membrane interposed between the cathode and the anode, wherein the electrolyte membrane may include the sulfonated poly(arylene sulfone) nanocomposite.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
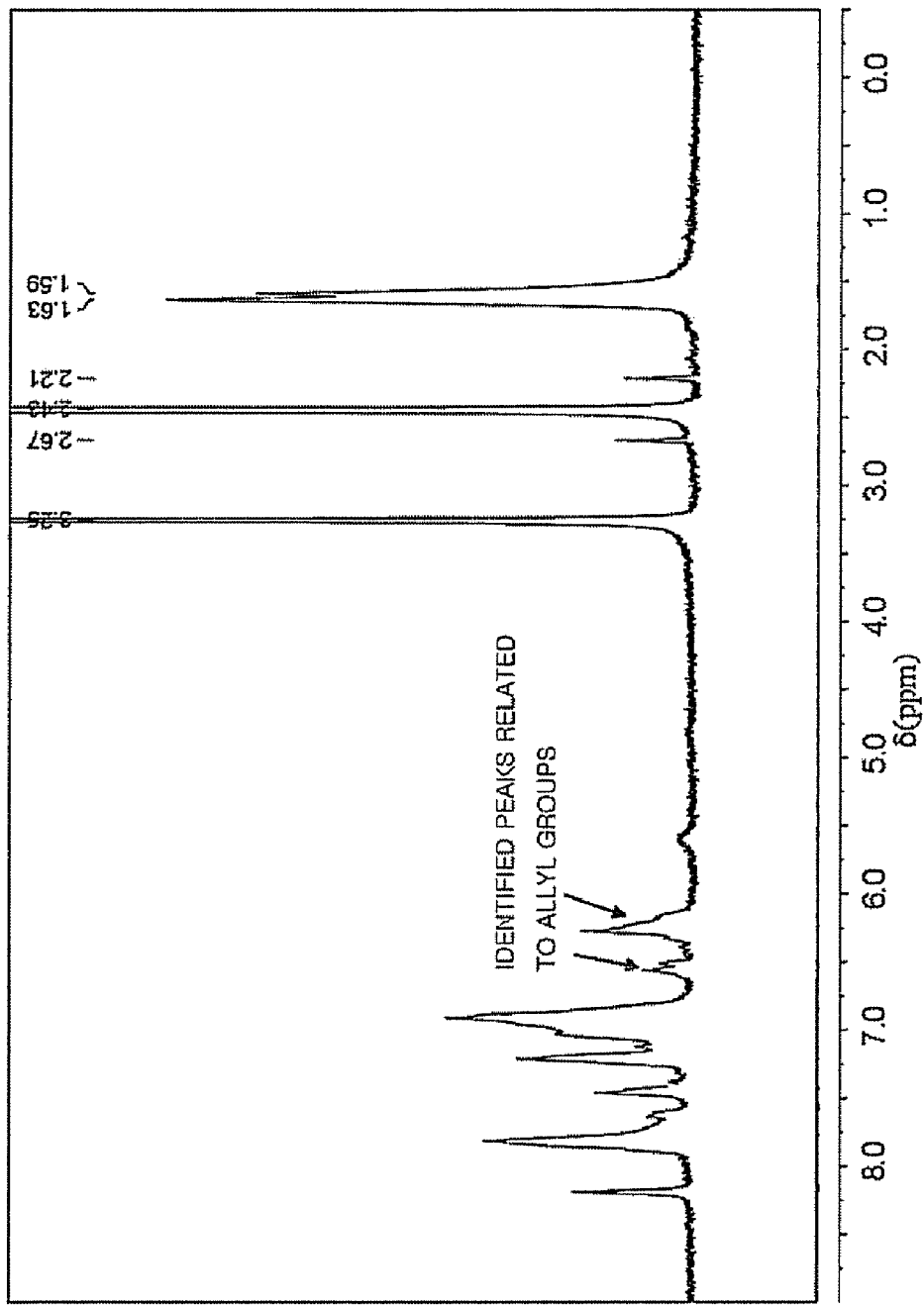
FIG. 1 is a graph illustrating a nuclear magnetic resonance (NMR) spectrum of the sulfonated poly(arylene sulfone) prepared according to Example 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A sulfonated poly(arylene sulfone) according to an embodiment is a copolymer including a first repeating unit represented by Formula 1A, a second repeating unit represented by Formula 1B, a third repeating unit represented by Formula 1C, and a fourth repeating unit represented by Formula 1D.

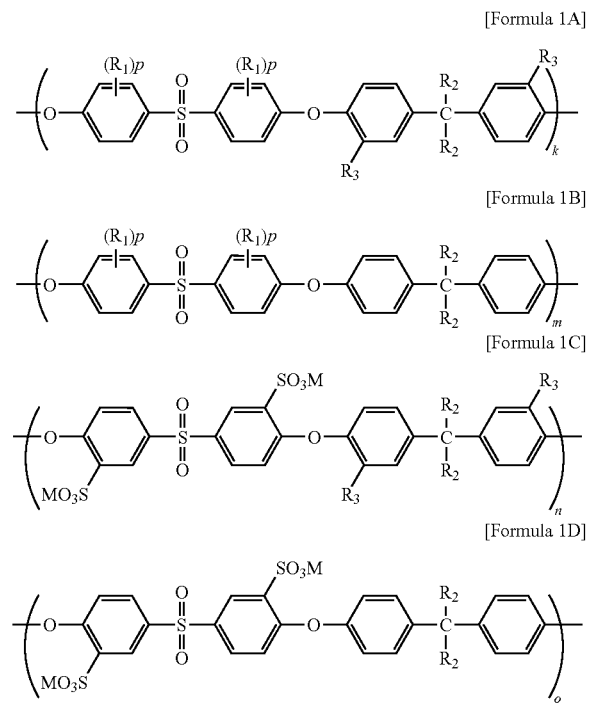

In Formulas 1A through 1D, the $R_1$s may be the same as or different from each other, and may be a $C_1$-$C_{10}$ alkyl group, a $C_2$-$C_{10}$ alkenyl group, a phenyl group, or a nitro group, p may be an integer in the range of 0 to 4, $R_2$ may be hydrogen, a methyl group or an ethyl group, $R_3$ may be a $C_2$-$C_{10}$ alkenyl group, M may be Na, K, or H, and k may be in the range of about 0.1 to about 0.9 mole, m may be in the range of about 0.1 to about 0.9 mole, and the sum of n and o may be in the range of about 0.1 to about 0.5 mole.

The polymerization degree of the sulfonated poly(arylene sulfone) may be in the range of about 5 to about 3,500.

The sum of n and o may be in the range of about 0.1 to about 0.5 mole, wherein n is in the range of about 0.01 to about 0.3 mole, and o is in the range of about 0.2 to about 0.49 mole.

In Formulas 1A through 1D, k, m, n, and o are mixing ratios of the first repeating unit, the second repeating unit, the third repeating unit, and the fourth repeating unit, based on the total amount of these, respectively.

In Formulas 1A though 1D, as a non-limiting example, $R_1$ may be hydrogen, p may be 0, $R_2$ may be —$CH_3$, or —$CF_3$, $R_3$ may be —$CH_2$—CH=$CH_2$, k may be in the range of about 0.1 to about 0.9, or more specifically, in the range of about 0.1 to about 0.4 mole. According to one embodiment, k may be about 0.25 mole, M may be Na, m may be in the range of about 0.1 to about 0.9 mole, or more specifically, in the range of about 0.2 to about 0.6 mole. According to one embodiment, m may be about 0.45, and n+o (the sum of n and o) may be in the range of about 0.1 to about 0.5 mole, or more specifically, about 0.3 mole.

In Formulas 1A though 1D, [(n+o)/(k+m+n+o)] is a ratio of the total molar number of the third repeating unit and the fourth repeating unit, which are repeating units of sulfonated sulfone, based on the total molar number of the first repeating unit, the second repeating unit, the third repeating unit, and the fourth repeating unit. The chemical properties, such as the ion conductance, of the sulfonated poly(arylene sulfone) including the first through fourth repeating units represented by Formulas 1A through 1D may vary according to the ratio [(n+o)/(k+m+n+o)]. Also, k may be in the range of about 0.1 to about 0.9 mole, or more specifically, in the range of about 0.1 to about 0.4 mole. According to one embodiment, k may be about 0.25 mole, m may be in the range of about 0.1 to about 0.9 mole, or more specifically, in the range of about 0.2 to about 0.6 mole. According to one embodiment, m may be about 0.45 mole, and n+o may be in the range of about 0.1 to about 0.5 mole, or more specifically, about 0.3 mole.

The sulfonation degree (=[(n+o)/(k+m+n+o)]×100) of the sulfonated poly(arylene sulfone) may be in the range of about 10 to about 50%. If the sulfonation degree of the sulfonated poly(arylene sulfone) is outside this range, processability during the preparation of membrane electrode assembly (MEA) may be inferior.

In Formulas 1A through 1B, when p is 0, the $R_1$ sites on the arylene ring are occupied by hydrogen.

Herein, for convenience, the term "sulfonated poly(arylene sulfone) described herein" refers to the sulfonated poly(arylene sulfone) copolymer including the first repeating unit represented by Formula 1A, the second repeating unit represented by Formula 1B, the third repeating unit represented by Formula 1C, and the fourth repeating unit represented by Formula 1D When p is 0, and $R_2$ is $CH_3$ in Formulas 1A through 1D, a sulfonated poly(arylene sulfone) according to another embodiment may be a compound including a repeating unit represented by Formula 2A, a repeating unit represented by Formula 2B, a repeating unit represented by Formula 2C, and a repeating unit represented by Formula 2D. The polymerization degree of the sulfonated poly(arylene sulfone) according to the present embodiment may be in the range of about 5 to about 3500.

[Formula 2A]

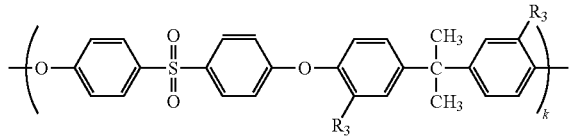

In Formula 2A, k is in the range of about 0.1 to about 0.5 mole, and $R_3$ is $C_2$-$C_{10}$ alkenyl,

[Formula 2B]

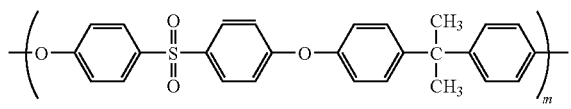

In Formula 2B, m is in the range of about 0.1 to about 0.5 mole,

[Formula 2C]

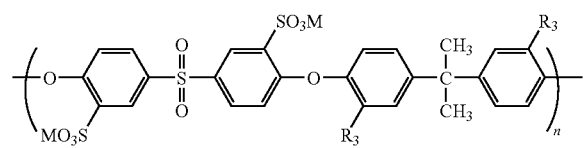

In Formula 2C, n is in the range of about 0.01 to about 0.3 mole, M is Na, K, or H, and $R_3$ is $C_2$-$C_{10}$ alkenyl.

[Formula 2D]

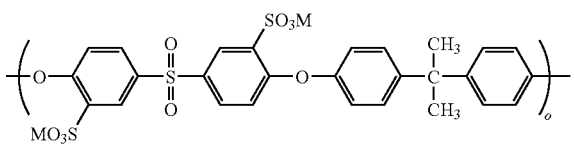

In Formula 2D, o is in the range of about 0.2 to about 0.49 mole, and M is Na, K, or H.

According to the present embodiment, the compound including the repeating unit represented by Formula 2A, the repeating unit represented by Formula 2B, the repeating unit represented by Formula 2C, and the repeating unit represented by Formula 2D may be a compound represented by Formula 2.

[Formula 2]

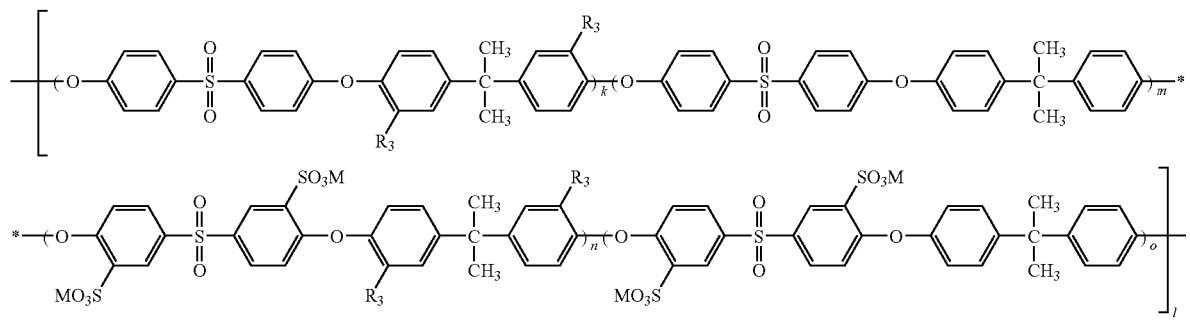

In Formula 2, k is in the range of about 0.1 to about 0.5 mole, m is in the range of about 0.1 to about 0.5 mole, the sum of n and o is in the range of about 0.2 to about 0.5, l is an integer in the range of 5 to 3500, and M is Na, K, or H. As a specific, non-limiting example, l may be an integer in the range of 300 to 3500.

In Formula 2, k may be in the range of about 0.2 to about 0.4 mole, or more specifically, about 0.25, m may be in the range of about 0.1 to about 0.5 mole, or more specifically, about 0.45, and n+o may be in the range of about 0.2 to about 0.5 mole, or more specifically, about 0.3.

$R_3$ is, for example, an allyl group. In this case, since $R_3$ contains an unsaturated bond, a cross-linked material based on the sulfonated poly (arylene sulfone) represented by Formula 2 may be formed through a cross-linking reaction using a photo initiator.

When $R_3$ is an allyl group, the compound including the repeating unit represented by Formula 2A, the repeating unit represented by Formula 2B, the repeating unit represented by Formula 2C, and the repeating unit represented by Formula 2D may be a compound represented by Formula 3.

[Formula 3]

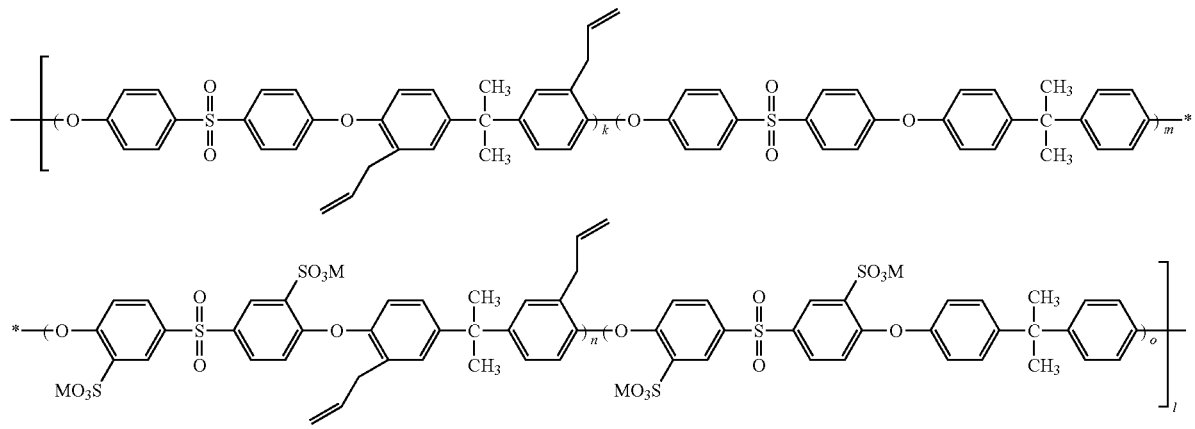

In Formula 3, k is in the range of about 0.1 to about 0.5 mole, m is in the range of about 0.1 to about 0.5, the sum of n and o is in the range of about 0.2 to about 0.5, l is an integer in the range of 5 to 3500, and M is Na, K, or H. As a specific, non-limiting example, l may be an integer in the range of 300 to 3500.

A product of a cross-linking reaction of the sulfonated poly(arylene sulfone) may be obtained by a cross-linking reaction between molecules of sulfonated poly(arylene sulfone), or a cross-linking reaction between a molecule of sulfonated poly(arylene sulfone) and another polyfunctional compound. Both types of cross-linking reaction products may be referred to herein collectively as a "cross-linked sulfonated poly(arylene sulfone)."

The polyfunctional compound may be a monomer that has two or more-functional group (having two or more double bonds) and that has a low softening point. A cross-linked sulfonated poly (arylene sulfone) having various structures may be prepared by adding the polyfunctional compound to the cross-linking reaction and then performing ultraviolet (UV)-curing.

As shown in Formula 3, when a monomer in which $R_3$ is substituted with an allyl group (e.g., diallylbisphenol A (DABPA)), among monomers for the preparation of the sulfonated poly (arylene sulfone) is used, the sulfonated poly (arylene sulfone) may be cured by a UV curing method, and the cross-linking degree of the cross-linked material of the sulfonated poly (arylene sulfone) may be controlled by adjusting the amount of DABPA. In addition, a glass transition temperature $T_g$ of the sulfonated poly(arylene sulfone) and a cross-linked material thereof may be reduced due to the high molecular motion of the allyl group so that the glass transition temperature $T_g$ may be controlled.

The solubility resistance of the cross-linked sulfonated poly (arylene sulfone) may vary according to the cross-linking degree thereof. That is, when the cross-linking degree of the cross-linked sulfonated poly (arylene sulfone) is high, the cross-linked material may swell rather than dissolving in a solvent.

The glass transition temperature $T_g$ and structure of the cross-linked material of the sulfonated poly(arylene sulfone) may be further controlled by adding a compound (e.g., a polyfunctional compound, or an oligomer) having two or more UV curable groups to a sulfonated poly(arylene sulfone) including DABPA units and then performing UV-curing the resultant material so as to connect the DABPA units of the sulfonated poly(arylene sulfone) to the polyfunctional compound (or oligomer) by a radical reaction initiated by light. That is, the compound having two or more UV curable groups functions as a bridge connecting molecules of the sulfonated poly(arylene sulfone). In addition, the compound having two or more UV curable groups may be used to form a soft fragment region of the cross-linked material so as to reduce the glass transition temperature $T_g$ of the cross-linked material.

Examples of the polyfunctional compound include bisphenol A ethoxylate diacrylate, triethyleneglycol divinylether, and hexanedioldiacrylate.

The amount of the polyfunctional compound may be in the range of about 0.1 to about 100 parts by weight based on 100 parts by weight of the sulfonated poly(arylene sulfone) described herein. When the amount of the polyfunctional compound is outside this range, the ion conductance of the cross-linked sulfonated poly(arylene sulfone) may be reduced.

The cross-linking reactions of the sulfonated poly(arylene sulfone) represented by Formula 3 and the polyfunctional compound may be performed by radiating light in the presence of a polymerization initiator.

The polymerization initiator may be at least one selected from the group consisting of benzoyl peroxide, benzophenone, and mixtures thereof. The amount of the polymerization initiator may be in the range of about 0.01 to about 10 parts by weight, or more specifically, in the range of about 0.5 to about 5 parts by weight based on 100 parts of the sulfonated poly(arylene sulfone) described herein.

According to embodiments, a clay nanocomposite including the sulfonated poly(arylene sulfone) described herein; and a clay may be provided.

According to an embodiment, in the clay nanocomposite, a clay of the clay nanocomposite has a layered structure and is uniformly dispersed in the sulfonated poly(arylene sulfone) or the cross-linked material thereof and the sulfonated poly (arylene sulfone) or the cross-linked material thereof is intercalated between layers of the clay having the layered structure. In some cases, the interlayer distance between the layers of the clay may be increased so that the layers may be exfoliated.

The clay nanocomposite in which the layers of the clay having the layered structure are dispersed in an intercalation form or an exfoliation form in the sulfonated poly(arylene sulfone) having high ionic conductivity has excellent mechanical strength, solubility resistance, brittleness, and ion conductivity.

When the clay-sulfonated polysulfone nanocomposite is used, although polysulfone of the clay-sulfonated polysulfone nanocomposite has a high sulfonation degree, mechanical strength may be maintained.

The clay is a silicate in which the interlayer distance is increased by water or by an intercalant. In addition, the clay has better hydrophilic properties than methanol. Therefore, when the clay is dispersed in an exfoliation form or an intercalation form in an electrolyte membrane in a nano scale, even a small amount of clay is sufficient to impede methanol crossover, and due to the clay's absorbing properties, a decrease in conductivity of the electrolyte membrane occurring when an inorganic material is added may be minimized.

The amount of the clay is in the range of about 0.01 to about 50 parts by weight based on 100 parts by weight of the clay nanocomposite. When the amount of the clay is less than 0.01 parts by weight, barrier properties of the clay may not be obtained. On the other hand, when the amount of the clay is more than 50 parts by weight, the clay may have high viscosity and may be brittle.

Examples of the clay, that is, an unmodified clay used in the present embodiment, may include a smectite-based clay, such as montmorillonite, bentonite, saponite, beidellite, nontronite, hectorite, stevensite, laponite, or the like.

According to another embodiment, in a clay nanocomposite using a sulfonated poly(arylene sulfone) or a cross-linked sulfonated poly(arylene sulfone), a clay having a layered structure may be uniformly dispersed in the sulfonated poly (arylene sulfone), and layers of the clay may be exfoliated. In some cases, the interlayer distance between the layers of the clay is increased so that the sulfonated poly(arylene sulfone) may be intercalated between the layers.

The clay nanocomposite according to the present embodiment in which the clay having the layered structure is dispersed in the sulfonated polysulfone having high ionic conductivity or the cross-linked material thereof in an intercalation form by the sulfonated poly (arylene sulfone) or the cross-linked sulfonated poly(arylene sulfone) or an exfoliation form, has excellent mechanical strength, heat resistance, and ionic conductivity. In addition, the clay nanocomposite may be initially humidified with water such that a polar organic fuel, such as methanol or ethanol may not permeate into the clay nanocomposite. Since the clay nanocomposite may impede the crossover of a polar organic fuel, it is very useful to form an electrolyte membrane for a fuel cell in which a polar organic fuel cell is directly provided to an anode.

Hereinafter, methods of preparing a sulfonated poly (arylene sulfone), a cross-linked material thereof, and a clay nanocomposite using the sulfonated poly(arylene sulfone) or the cross-linked sulfonated poly(arylene sulfone) according to embodiments will be described.

First, the sulfonated poly(arylene sulfone) may be prepared by mixing a polymerizable monomer represented by Formula 4, a polymerizable monomer represented by Formula 5, a diol compound represented by Formula 6, and a diol compound represented by Formula 7 with a solvent, and a base, and then performing polymerization.

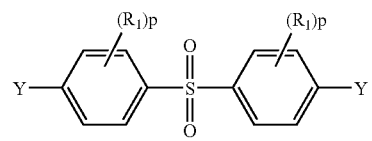

[Formula 4]

In Formula 4, $R_1$ and p are the same as in Formulas 1A through 1D, and
Y is Cl, F, Br, or I.

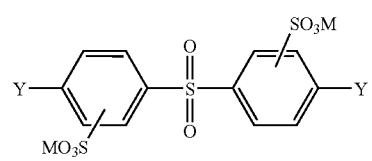

[Formula 5]

In Formula 5, M is the same as in Formulas 1A through 1D, and
Y is Cl, F, Br, or I.

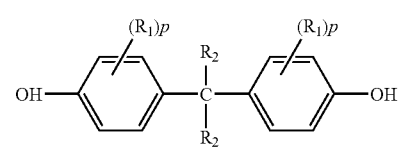

[Formula 6]

In Formula 6, $R_1$, $R_2$, and p are the same as in Formulas 1A through 1D.

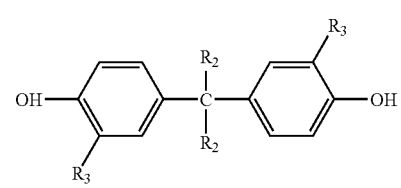

[Formula 7]

In Formula 7, $R_2$, and $R_3$ are the same as in Formulas 1A through 1D.

Examples of the polymerizable monomer represented by Formula 4 include 4,4' dichlorodiphenyl sulfone (DCDPS), and 4,4'-difluorodiphenyl sulfone. Examples of the polymerizable monomer represented by Formula 5 include sulfated-4,4 dichlorodiphenyl sulfone (s-DCDPS).

Examples of the diol compound represented by Formula 6 include bisphenol A (BA), and the diol compound represented by Formula 7 may be diallylbisphenol A (DABPA).

The base may be $K_2CO_3$, or the like. The amount of the base may be in the range of about 1 to about 3 mole based on 1 mole of the polymerizable monomer represented by Formulas 4 and 5, and diol compounds represented by Formulas 6 and 7.

A polymerization temperature of the polymerization may be in the range of about 100 to about 190° C. so that water generated during a nucleophilic reaction may be removed while the monomer mixture is being refluxed with toluene. The polymerization product is cooled and then subjected to a work-up process, such as precipitation using isopropyl alcohol (IPA), or distilled water.

The amount of the polymerizable monomer (sulfonated dihalide) represented by Formula 5 may in the range of about 20 to about 60 mole based on 1 mole of the polymerizable monomer (dihalide) represented by Formula 4. When the amount of the polymerizable monomer represented by Formula 5 is less than 20 mole, the ionic conductivity of an electrolyte membrane may be low. On the other hand, when the amount of the polymerizable monomer represented by Formula 5 is more than 50, the swelling degree of a polymer due to water may be so high that it is difficult to form an electrolyte membrane.

The total amount of the diol compound represented by Formula 6 and the diol compound represented by Formula 7 may be in the range of about 0.1 to about 0.40 mole based on the 1 mole of the polymerizable monomer represented by Formula 4 and the polymerizable monomer represented by Formula 5. When the total amount of the diol compounds are outside this range, the desired reactivity of the polymerization may not be obtained.

In addition, the amount of the diol compound represented by Formula 7, having an unsaturated functional group that may undergo light-induced cross-linking, may be in the range of about 0.1 to about 0.5 mole based on 1 mole of the diol compound represented by Formula 6 and the diol compound represented by Formula 7.

When the amount of the diol compound represented by Formula 7 is less than 0.1 mole, cross-linking is less unlikely to occur. On the other hand, when the amount of the diol compound represented by Formula 7 is more than 0.5 mole, a gel may be formed.

Next, the method of preparing the cross-linked material by using the sulfonated poly(arylene sulfone) described herein will be described.

The sulfonated poly(arylene sulfone) described herein is dissolved in a solvent, a photopolymerization initiator is added to the resultant, and then light is radiated to the resultant material to perform photopolymerization.

Alternatively, the sulfonated poly(arylene sulfone) described herein and the photopolymerization initiator are dissolved in a solvent, a polyfunctional compound such as hexanedioldiacrylate is added to the resultant material, and then light is radiated to the resultant material to perform photopolymerization. The adding order does not affect properties of the cross-linked material.

The polymerization initiator may be benzoylperoxide, benzophenone, or the like. The amount of the polymerization initiator may be in the range of about 0.1 to about 5 parts by weight based on 100 parts by weight of the sulfonated poly(arylene sulfone).

A structure of the cross-linked material may be identified by nuclear magnetic resonance (NMR) spectroscopy. New peaks are formed in the range of about 6.2 to about 6.5 ppm that are not present in the sulfonated poly(arylene sulfone).

Hereinafter, a method of preparing a clay nanocomposite by using the sulfonated poly(arylene sulfone) described herein, or the cross-linked sulfonated poly(arylene sulfone) will be described.

First, a simple solution dissolving method is performed, that is, the sulfonated poly(arylene sulfone) described herein, or the cross-linked sulfonated poly(arylene sulfone) is dissolved in a solvent, and then a clay dispersion solution prepared by dispersing an unmodified clay into dispersing medium is added thereto. The resultant material is strongly stirred at room temperature (for example, 20° C.) for about 6 to about 48 hours, or, for example, for about 24 hours. The solvent may be dimethylacetamide, N-methylpyrrolidone (NMP), dimethylformamide, dimethylsulfoxide, or the like.

The amount of the solvent may be about 100 to about 600 parts by weight based on 100 parts by weight of the sulfonated poly(arylene sulfone) described herein, or the cross-linked sulfonated poly(arylene sulfone).

Another example of the method of preparing the clay nanocomposite will now be described. The monomer compounds represented by Formulas 4, 5, 6, and 7 and $K_2CO_3$ are used, and water and toluene are removed. A nucleophilic reaction is performed on the resultant material at a temperature in the range of about 100 to about 190° C. to synthesize a polymer. A temperature of a reactor is cooled to about 70° C., and then a clay that is previously dispersed in a solvent for the polymerization (clay/NMP=2 g/50 g) is injected into the reactor. The resultant material is stirred for about 12 hours or more and then precipitated. As a result, the clay nanocomposite is prepared.

According to an embodiment, the weight average molecular weight of the sulfonated poly(arylene sulfone) or the cross-linked material thereof may be in the range of about 20,000 and about 3,500,000, and the number average molecular weight of the sulfonated poly(arylene sulfone) or the cross-linked material thereof may be in the range of about 10,000 to about 1,700,000. When the weight average molecular weight and the number average molecular weight are less than 20,000 and 10,000, respectively, film formation properties may decrease so that it may be difficult to obtain an electrolyte membrane. On the other hand, when the weight average molecular weight and the number average molecular weight is more than 3,500,000 and 1,700,000, respectively, processability may deteriorate.

It may be identified by X-ray diffraction pattern analysis (CuK-α characteristic X-ray wavelength (1.541 Å) that an interlayer distance of the clay in the clay nanocomposite tends to be increased. Samples may be measured in a powder or thin film state at room temperature (20° C.) in air atmosphere.

According to X-ray diffraction analysis results, a peak of a 001 surface of clay disappears (exfoliated structure) or is widened (intercalation structure) in the clay nanocomposite.

When an unmodified clay (laponite) together with the sulfonated poly (arylene sulfone) and/or the cross-linked material thereof is simply dispersed at room temperature, the 2θ value of the diffraction pattern of the nanocomposite in a dry form is about 6.34° (the interlayer distance is about 1.4 Å). When the interlayer distance widens, the 2θ value of the X-ray diffraction pattern becomes 6.34° or less. When the interlayer further widens, the 2θ value of the X-ray diffraction pattern reaches the mechanical lowest limit, and ultimately, the dry unmodified clay no longer provides an X-ray diffraction pattern, that is, the dry unmodified clay has an exfoliation structure.

A method of preparing an electrolyte membrane of a fuel cell using the clay nanocomposite according to an embodiment will now be described in detail.

An electrolyte membrane forming composition which is prepared by mixing the clay nanocomposite prepared as described above and a solvent may be cast or coated onto a support to form a nanocomposite electrolyte membrane. The solvent may be dimethylacetamide or NMP. The amount of the solvent may be in the range of about 100 to about 600 parts by weight based on 100 parts by weight of the clay nanocomposite. When the amount of the solvent is outside this range, processability during casting or coating may deteriorate, and mechanical properties of the nanocomposite electrolyte membrane may decrease.

The thickness of the nanocomposite electrolyte membrane according to the present embodiment is not particularly limited. However, when the nanocomposite electrolyte membrane is too thin, the strength of the electrolyte membrane may be too low. On the other hand, when the nanocomposite electrolyte membrane is too thick, an internal resistance of a fuel cell may be too high. Accordingly, the nanocomposite electrolyte membrane may have a thickness of about 10 to about 200 μm.

A fuel cell including the nanocomposite electrolyte membrane according to an embodiment of will now be described in detail.

The nanocomposite electrolyte membrane may be used in any fuel cell that includes an electrolyte membrane containing a polymer electrolyte, such as polymer electrolyte membrane fuel cell (PEMFC) using hydrogen as a fuel. An example of the PEMFC may be a direct methanol fuel cell using a mixture vapor of methanol and water or a methanol aqueous solution as a fuel. For example, the nanocomposite electrolyte membrane may be used in a direct methanol fuel cell using methanol aqueous solution as a fuel.

In a fuel cell that includes a cathode in which oxygen is reduced, an anode in which a fuel is oxidized, and an electrolyte membrane interposed between the cathode and the anode, the electrolyte membrane may be the nanocomposite electrolyte membrane described above.

The cathode includes a catalyst layer that promotes reduction of oxygen. The catalyst layer may include a catalyst particle and a polymer having a cation exchanger. The catalyst may be, for example, a carbon supported Pt catalyst (Pt/C catalyst).

The anode includes a catalyst layer that promotes oxidation of a fuel, such as hydrogen, natural gas, methanol, or ethanol. The catalyst layer may include a catalyst particle and a polymer having a cation exchanger. The catalyst may be, for example, a carbon supported Pt catalyst or a carbon supported Pt—Ru catalyst. The carbon supported Pt—Ru catalyst may be useful when an organic fuel, excluding hydrogen, is directly provided to the anode.

The catalyst used in the cathode and the anode may include catalyst metal particles and a catalyst support. The catalyst support may be a solid particle that has conductivity and micropores enabling the support particles to support catalyst metal particles. Such a solid particle may be carbon powder, such as carbon black, ketchen black, acetylene black, active carbon powder, carbon fiber powder, or a mixture of these. The polymer having the cation exchanger may be the polymer described above.

The catalyst layers of the cathode and the anode may contact the nanocomposite electrolyte membrane.

In addition to the catalyst layer, each of the cathode and the anode may further include a gas diffusion layer. The gas diffusion layer includes a porous material having electrical conductivity. The gas diffusion layer acts as a current collector and a passage through which reactants and generated reaction products move. The gas diffusion layer may be formed of carbon paper, such as, for example, water-repellent carbon paper. According to one embodiment, the gas diffusion layer may be formed of water-repellent carbon paper that is coated with a water-repellent carbon black layer. The water-repellent carbon paper may include a hydrophobic polymer, such as poly (tetrafluoroethylene) (PTFE). The hydrophobic polymer may be sintered. Water-repellent material may be used in the gas diffusion layer in order to allow polar liquid reactants and gas reactants to move therethrough. In the water-repellent carbon paper having a water-repellent carbon black layer, the water-repellent carbon black layer may include carbon black and a hydrophilic polymer, such as PTFE, as a hydrophobic binder, and is attached to one surface of the water-repellent carbon paper. The hydrophobic polymer of the water-repellent carbon black layer may be sintered.

The cathode and the anode may be manufactured using various methods disclosed in the related art, and thus need not be described in detail.

The fuel cell according to the present embodiment may be, for example, a direct methanol fuel cell.

The present embodiments will be described in further detail with reference to the following examples. These examples are for illustrative purposes only and are not intended to limit the scope of the present embodiments.

SYNTHESIS EXAMPLE 1

1) Preparation of the Sulfonated Poly(Arylene Sulfone) Represented by Formula 3

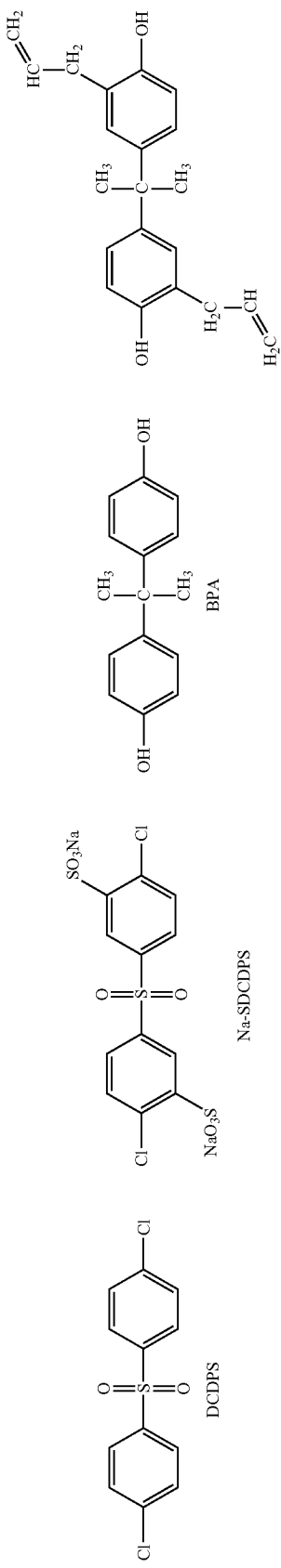
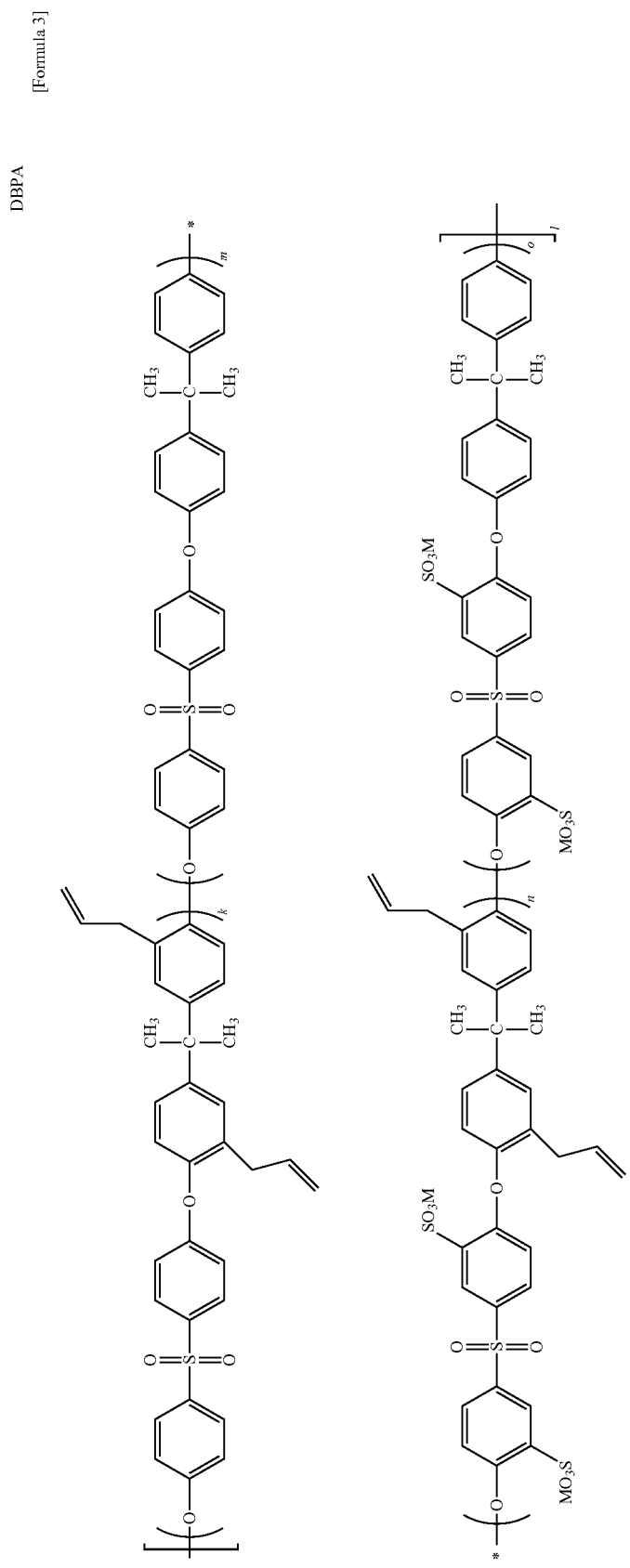

In Formula 3, k is about 0.25 mole, m is about 0.6 mole, n+o is about 0.3 mole, and l is an integer of about 3200.

4,4'-dichlorodiphenyl sulfone (DCDPS), sodium sulfonated 4,4'-dichlorodiphenyl sulfone (Na-sDCDPS), bisphenol A, and diallylbisphenol were dissolved in ratios shown in Table 1 in 69 ml of N-methylpyrrolidone, 12 g of $K_2CO_3$ was added to the resultant, and then the resultant mixture was mixed for about 8 hours at about 180° C., thereby completing the preparation of the sulfonated poly(arylene sulfone) represented by Formula 3.

TABLE 1

| Sample No. | DCDPS (Molar Ratio) | Na-SDCDPS (Molar Ratio) | BPA (Molar Ratio) | DABPA (Molar Ratio) | Amount* of DABPA (%) |
|---|---|---|---|---|---|
| Comparative Example 1 | 7 | 3 | 10 | 0 | 0 |
| Example 1 | 7 | 3 | 9 | 1 | 10 |
| Example 2 | 7 | 3 | 7.5 | 2.5 | 25 |
| Example 3 | 7 | 3 | 5 | 5 | 50 |
| Example 4 | 7 | 3 | 2.5 | 7.5 | 75 |
| Example 5 | 7 | 3 | 0 | 10 | 100 |
| Example 6 | 8 | 2 | 7.5 | 2.5 | 25 |
| Example 7 | 6 | 4 | 7.5 | 2.5 | 25 |

*{[Amount of DABPA(mole)/(Amount of DABPA(mole) + Amount of BPA(mole))] × 100}

TABLE 2

| Sample No. | Amount of DABPA | Molecular Weight ($M_n$) | Molecular Weight ($M_w$) | Whether Gel is formed or not | SD value (Theory Value/Measured Value) | Amount of DABPA (Measured Value) |
|---|---|---|---|---|---|---|
| Comparative Example 1 | 0 | 809,455 | 1,273,000 | None | 30 | 0 |
| Example 1 | 10% | 981,000 | 1,928,000 | None | 30 | 8.5 |
| Example 2 | 25% | 923,000 | 1766,000 | None | 30 | 25.9 |
| Example 3 | 50% | 886,000 | 1,700,000 | Small quantity | 30 | 50.0 |
| Example 4 | 75% | Unmeasurable due to formation of Gel | — | Large quantity | 30 | 69.6 |
| Example 5 | 100% | Unmeasurable due to formation of Gel | — | Large quantity | 30 | 81.2 |
| Example 6 | 25% | 1,202,000 | 2,394,000 | None | 20% | 25 |
| Example 7 | 25% | 1,242,000 | 2,471,000 | None | 40% | 25 |

As shown in Table 2, as the amount of DABPA was increased, a gel was increasingly formed. In addition, even if the amount of s-DCDPS was increased, little change in the molecular weight of the sulfonated ply)arylene sulfone) occurred. A nuclear magnetic resonance (NMR) spectrum of the sulfonated poly(arylene sulfone) that was prepared according to each of Examples 1 through 5 was performed. The results are shown in FIG. 2.

Referring to FIG. 1, peaks related to an allyl group of DABPA in the sulfonated poly(arylene sulfone) prepared according to Example 2 may be identified.

Figure 2:
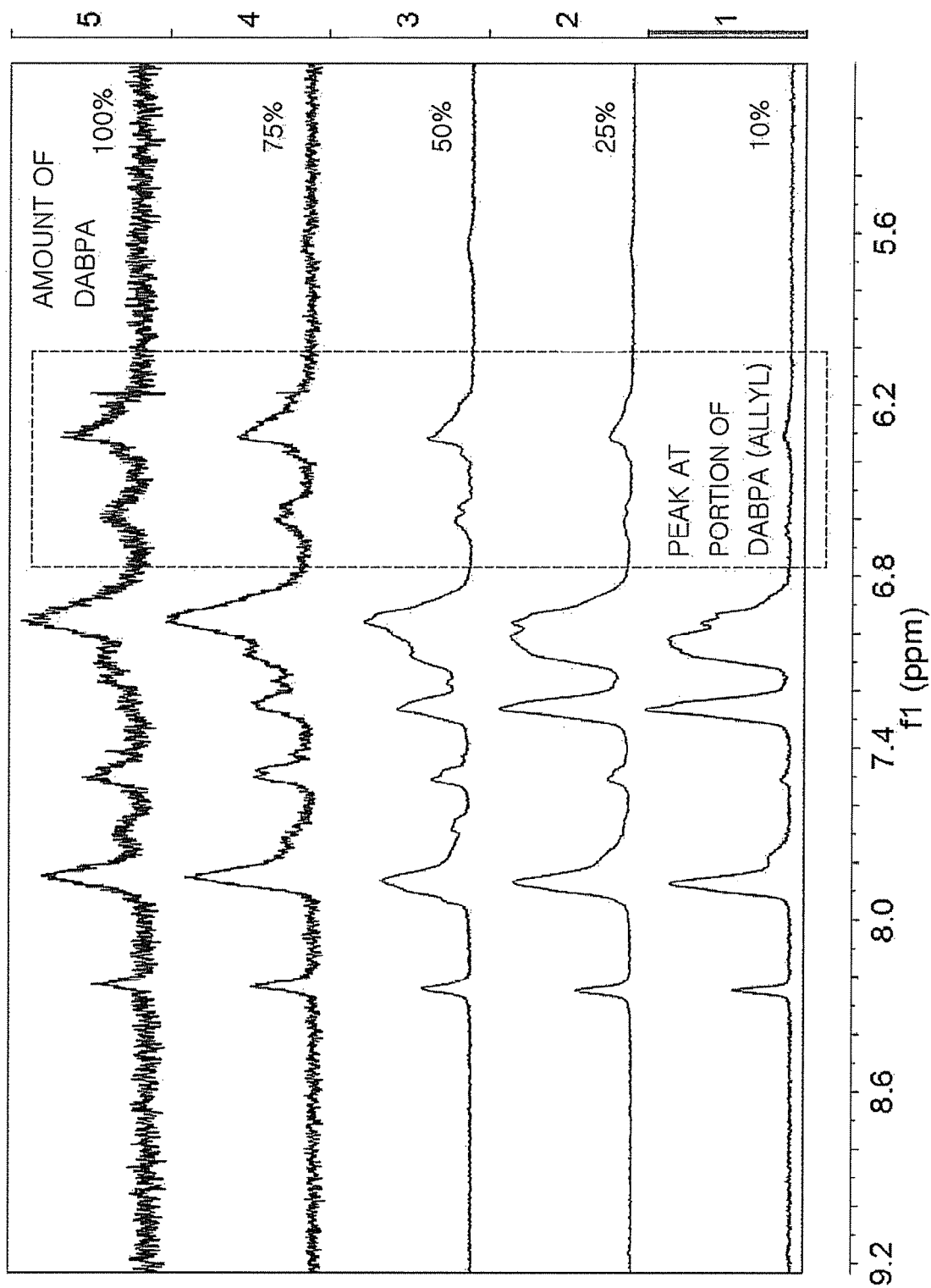
FIG. 2 is a graph of an NMR spectrum of the sulfonated poly(arylene sulfone) prepared by adjusting the amount of diallylbisphenol A (DABPA) (Examples 1 to 5)

FIG. 2 is a graph of a nuclear magnetic resonance (NMR) spectrum of the sulfonated poly(arylene sulfone) prepared by adjusting the amount of DABPA (Examples 1 to 5).

Figure 3:
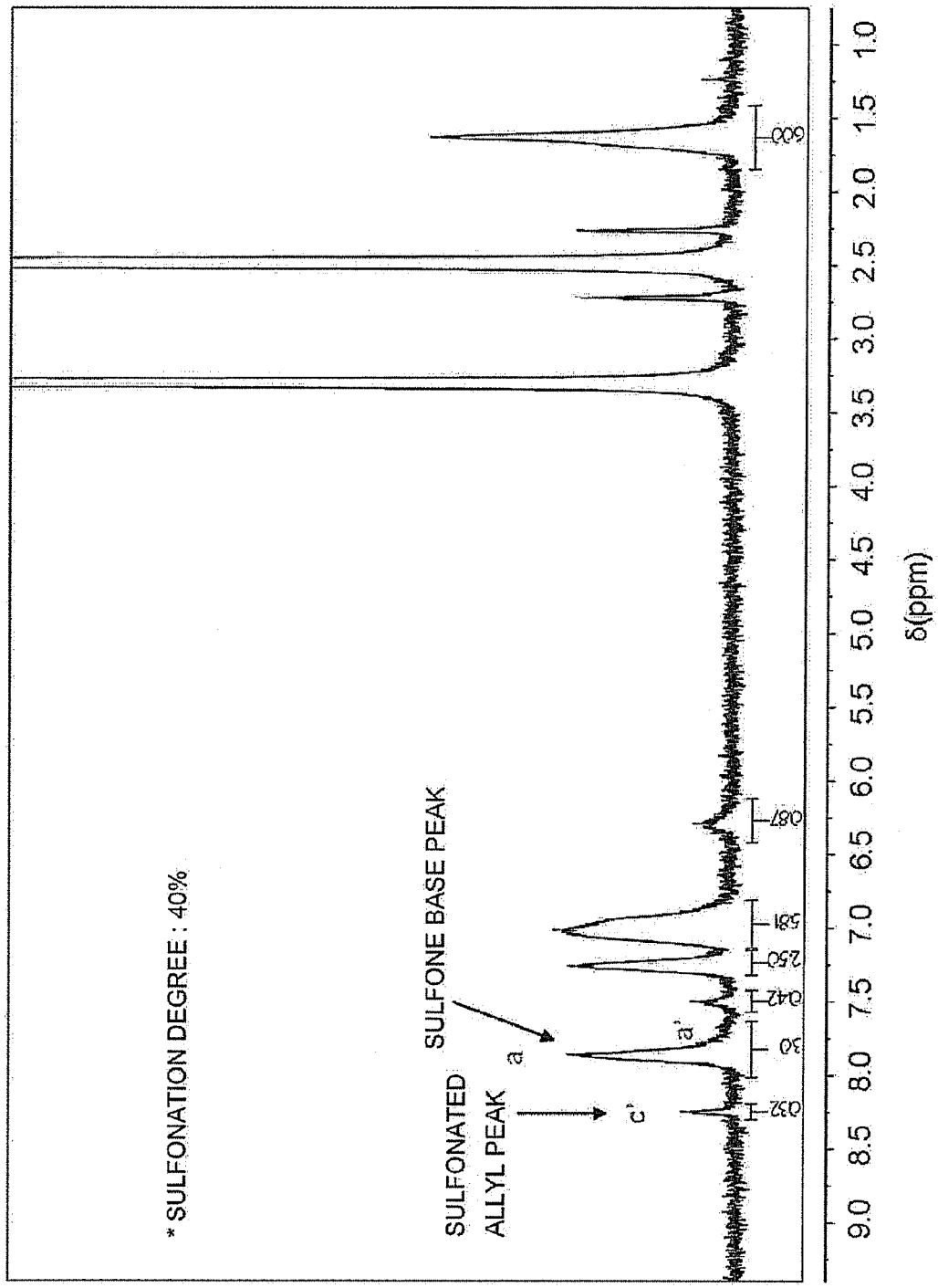
FIG. 3 is a graph of an NMR spectrum of the sulfonated poly(arylene sulfone) prepared according to Example 6.
Figure 4:
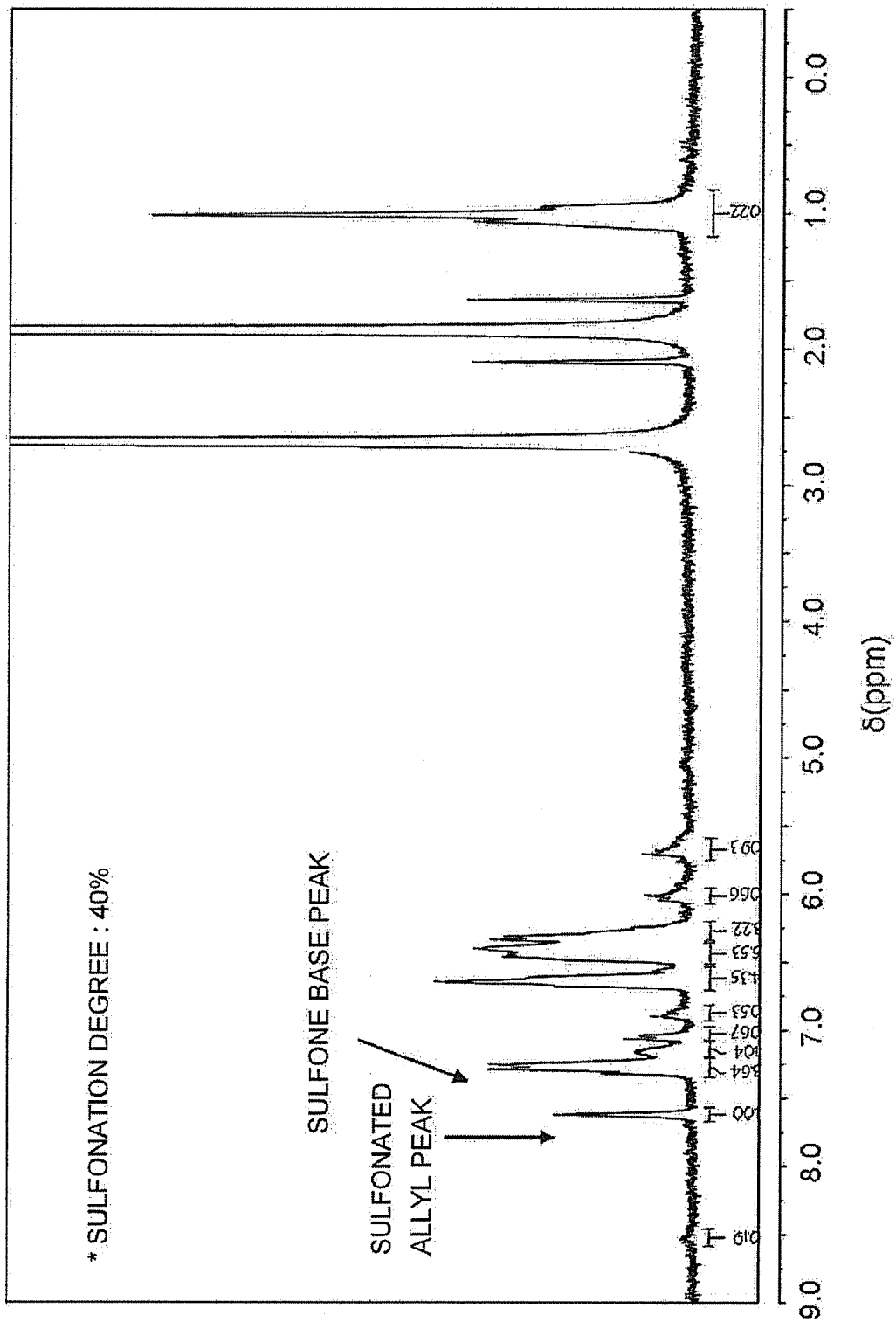
FIG. 4 is a graph of an NMR spectrum of the sulfonated poly(arylene sulfone) prepared according to Example 7.

FIG. 3 is a graph of an NMR spectrum of the sulfonated poly(arylene sulfone) prepared according to Example 6. FIG. 4 is a graph of an NMR spectrum of the sulfonated poly (arylene sulfone) prepared according to Example 7.

2) Cross-Linking of the Sulfonated Poly(Arylene Sulfone) Represented by Formula 3

Hexanedioldiacrylate and 0.3 mole of a photo initiator were added in ratios shown in Table 3 to the sulfonated poly(arylene sulfone) represented by Formula 3, and then UV rays were radiated onto the resultant material, thereby preparing the cross-linked material of the sulfonated poly (arylene sulfone) represented by Formula 3.

TABLE 3

| Sample No. | DCDPS (Molar Ratio) | Na-SDCDPS (Molar Ratio) | BPA (Molar Ratio) | DABPA (Molar Ratio) | Amount of polyfunctional compound (hexanedioldiacrylate) (mole)/(mol % of cross-inked material based on amount of DABPA) |
|---|---|---|---|---|---|
| Example 8 | 7 | 3 | 7.5 | 2.5 | 0 |
| Example 9 | 7 | 3 | 7.5 | 2.5 | 0.25 (5 mol %) |
| Example 10 | 7 | 3 | 7.5 | 2.5 | 0.375 (10 mol %) |
| Example 11 | 7 | 3 | 7.5 | 2.5 | 0.625 (100 mol %) |
| Example 12 | 7 | 3 | 0 | 10 | 0 |
| Example 13 | 8 | 2 | 7.5 | 2.5 | 0 |
| Example 14 | 8 | 2 | 7.5 | 2.5 | 0.25 (5 mol %) |
| Example 15 | 8 | 2 | 7.5 | 2.5 | 0.375 (10 mol %) |
| Example 16 | 8 | 2 | 7.5 | 2.5 | 0.625 (100 mol %) |
| Example 17 | 6 | 4 | 7.5 | 2.5 | 0 |

TABLE 4

Change in Tg

| Sample No. | Molar ratio of S-DCDPS/DABPA/ polyfunctional compound | Amount of DABPA (mole) | Amount of polyfunctional compound (mole) | $T_g$ (°C.) |
|---|---|---|---|---|
| Comparative Example 1 | 3/0/0 | 0 | — | 203 |
| Example 8 | 30/25/0 | 25% | 0 | 141 |
| Example 9 | 30/25/5 | 25% | 5 | 161 |
| Example 10 | 30/25/10 | 25% | 10 | 149 |
| Example 11 | 30/25/100 | 25% | 100% | 85 |

Electrolyte membranes were prepared using the sulfonated poly(arylene sulfone)s that were prepared under each condition shown in Table 4. The $T_g$ of the electrolyte membrane was reduced as the amount of the polyfunctional compound was increased. When a change in the amount of s-DCDPS occurred, the results regarding the amount of a polyfunctional compound were similar to those of Table 4.

After the electrolyte membrane was immersed in a 3M methanol aqueous solution, the swelling ratio of the electrolyte membrane was measured. The results are shown in Table 5. In Table 5, 'T' is the thickness of the electrolyte membrane, TD is the thickness measured in a perpendicular direction to a coating direction, and MD is the thickness measured in the coating direction. In addition, 'Dry' indicates values measured in a dry state of the electrolyte membrane, and a swelling ratio is measured after the electrolyte membrane was immersed in 3M MeOH for about 48 hours.

As shown in Table 5, the swelling ratio of the electrolyte membrane prepared according to each of Examples 8 to 16 with respect to methanol is lower than in the fluorine-based electrolyte membrane of Comparative Example 2. Due to the low swelling ratio of the electrolyte membrane prepared according to each of Examples 8 to 16, the electrolyte membrane had a low cross-over degree and excellent dimensional stability.

Electrolyte membrane were prepared using sulfonated poly(arylene sulfone)s that were prepared under each condition shown in Tables 1 and 2. The methanol transmittance properties of the electrolyte membranes were measured. The results are shown in Table 6. In addition, a 3M methanol aqueous solution was used as a methanol solution.

TABLE 6

[Concentration of methanol aqueous solution: 3M, Volume of MeOH (Volume of chamber): 35 cm², Area: 4 cm², and Room Temperature (25° C.)]

| Sample No. | Molar ratio of s-DCDPS/ DABPA/polyfunctional compound | Transmittance (cm²/s) | Thickness (Wet) (μm) |
|---|---|---|---|
| Example 8 | 30/25/0 | $4.85 \times 10^{-7}$ | 45 |
| Example 9 | 30/25/5 | $4.34 \times 10^{-7}$ | 45 |
| Example 10 | 30/25/10 | $4.43 \times 10^{-7}$ | 45 |
| Example 13 | 20/25/0 | $3.98 \times 10^{-8}$ | 45 |
| Example 14 | 20/25/10 | $4.00 \times 10^{-8}$ | |
| Example 15 | 20/25/25 | $4.04 \times 10^{-8}$ | 45 |
| Example 16 | 20/25/50 | $5.41 \times 10^{-8}$ | 45 |
| Comparative Example 2 | NAFION115 | $1.38 \times 10^{-6}$ | 140 |

TABLE 5

Concentration: 3M, Room temperature (25 degrees)

| | Molar ratio of | Dry | | | Swelling Ratio | | | | |
|---|---|---|---|---|---|---|---|---|---|
| Sample No. | S-DCDPS/DABPA/ polyfunctional group | T (μm) | TD (cm) | MD (cm) | T (μm) | TD (cm) | MD (cm) | Area | Volume |
| Example 8 | 35/25/0 | 57 | 1.5 | 2 | 14% | 21% | 20% | 44% | 64% |
| Example 9 | 35/25/10 | 55 | 1.5 | 2 | 9% | 15% | 16% | 33% | 45% |
| Example 10 | 35/25/15 | 49 | 1.5 | 2 | 4% | 14% | 16% | 32% | 37% |
| Example 11 | 35/25/25 | 48 | 1.5 | 2 | 6% | 13% | 15% | 30% | 38% |
| Example 13 | 20/25/0 | 60 | 1.5 | 2 | 2% | 1% | 4% | 6% | 8% |
| Example 14 | 20/25/10 | 104 | 1.5 | 2 | 1% | 5% | 4% | 9% | 10% |
| Example 15 | 20/25/15 | 64 | 1.5 | 2 | 2% | 3% | 4% | 7% | 8% |
| Example 16 | 20/25/25 | 71 | 1.5 | 2 | 4% | 4% | 5% | 10% | 14% |
| Comparative Example 2 | NAFION 115 | 123 | 1.5 | 2 | 20% | 17% | 21% | 41% | 69% |

As shown in Table 6, the methanol transmittance of electrolyte membranes prepared according to Examples 8 to 16 were reduced compared to those of Comparative Example 2. This reduction occurred due to excellent dimensional stability and low swelling ratio. As methanol transmittance was reduced, mixing potential was reduced, thereby improving the performance of a fuel cell.

Electrolyte membranes were prepared using sulfonated poly(arylene sulfone)s prepared under each condition shown in Table 2. The conductance of the electrolyte membrane was measured at 25° C. The electrolyte membranes prepared according to each of Examples 8 to 16 had higher unit conductance compared to those of Comparative Example 2.

Electrolyte membrane were prepared using the sulfonated poly(arylene sulfone) prepared as described above and a cross-linked material thereof. After the electrolyte membrane was immersed in NMP for 72 hours, the condition of the electrolyte membranes was checked.

Since the electrolyte membrane including the sulfonated poly(arylene sulfone) was dissolved in the NMP, the electrolyte membrane was not maintained in a shape of a membrane. However, the electrolyte membrane including the cross-linked material of the sulfonated poly(arylene sulfone) was only swelled by the NMP and maintained the shape of a membrane. Thus, it could be seen that the cross-linked material of the sulfonated poly(arylene sulfone) had high solubility resistance.

SYNTHESIS EXAMPLE 2

Preparation of Sulfonated Poly(Arylene Sulfone)-Clay Nanocomposite

Method 1:

A polymer was polymerized under the same condition as in Synthesis Example 1. Clay (clay/NMP=2 g/50 g) that was previously dispersed in NMP was injected into a reactor including 3 g of the polymer in 30 ml of NMP. Then, the resultant mixture was stirred at room temperature for 24 hours or more, and was precipitated in isopropyl alcohol (IPA). The precipitated material was separated from the resultant mixture, and then was dried, thereby completing the preparation of a sulfonated poly(arylene sulfone)-clay nanocomposite.

Method 2:

A polymer was polymerized under the same condition as in Synthesis Example 1. A temperature of a reactor was decreased to the range of 180° C. to 70° C. 1 g of clay (clay/NMP=2 g/50 g) that was previously dispersed in NMP was measured by a spoid, was injected into the reactor, and then was stirred for 12 hours or more.

Then, the resultant mixture was precipitated in 1000 ml of isopropyl alcohol (IPA) or distilled water, and then salts (for example, $K_2CO_3$, and KCl) were removed by washing the precipitated polymer composite two times with distilled water.

The respective x-ray patterns of the products of Method 1 and Method 2 were examined to determine whether an interlayer distance between layers of a clay of the prepared sulfonated poly(arylene sulfone)-clay nanocomposite was increased. In both Methods 1 and 2, when the amount of the clay was equal to or less than 10 wt % based on 100 wt % of the clay and the polymer prepared according to Synthesis Example 1, the clay became partially exfoliated. When the amount of the clay was equal to or more than 10 wt % based on 100 wt % of the clay and the polymer prepared according to Synthesis Example 1, an interlayer distance between layers widened, and thus the clay had an intercalation structure. [see FIGS. 6 and 7]

Figure 6:
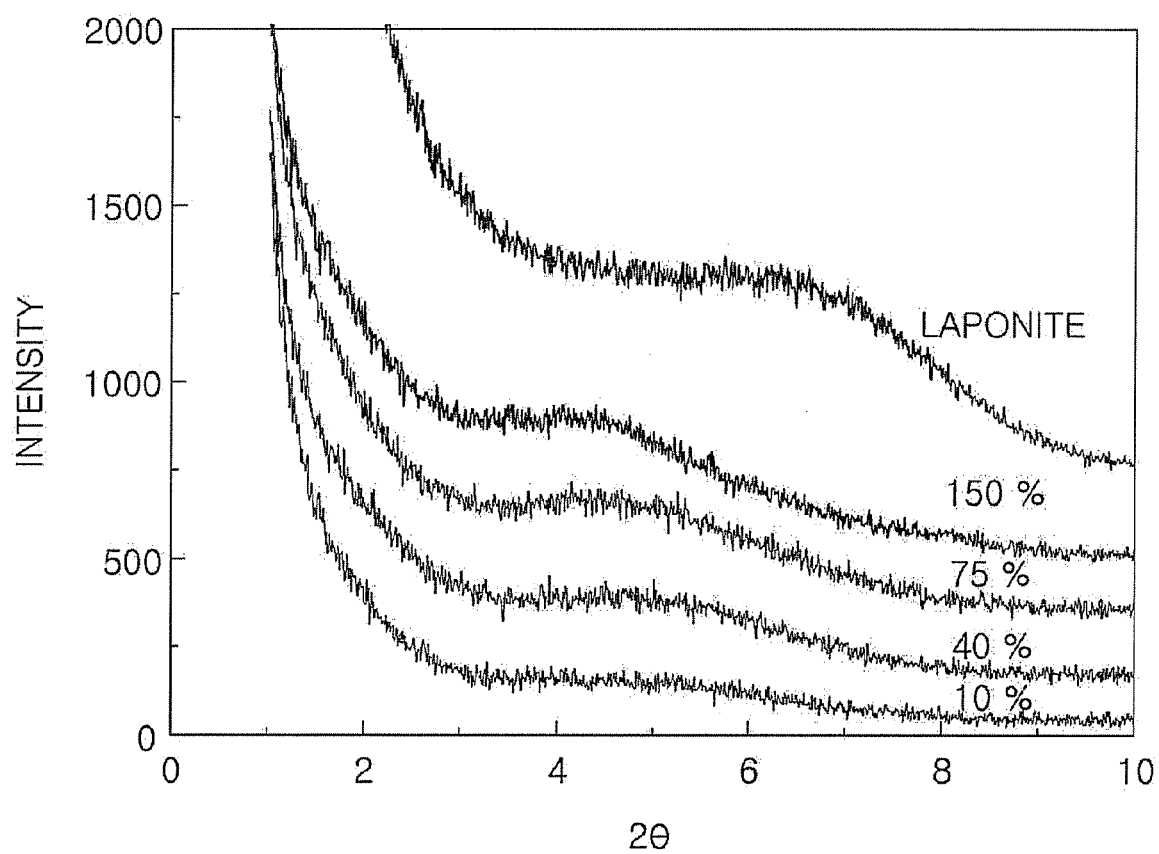
FIG. 6 is a graph illustrating X-ray patterns of a clay nanocomposite prepared according to Method 1.
Figure 7:
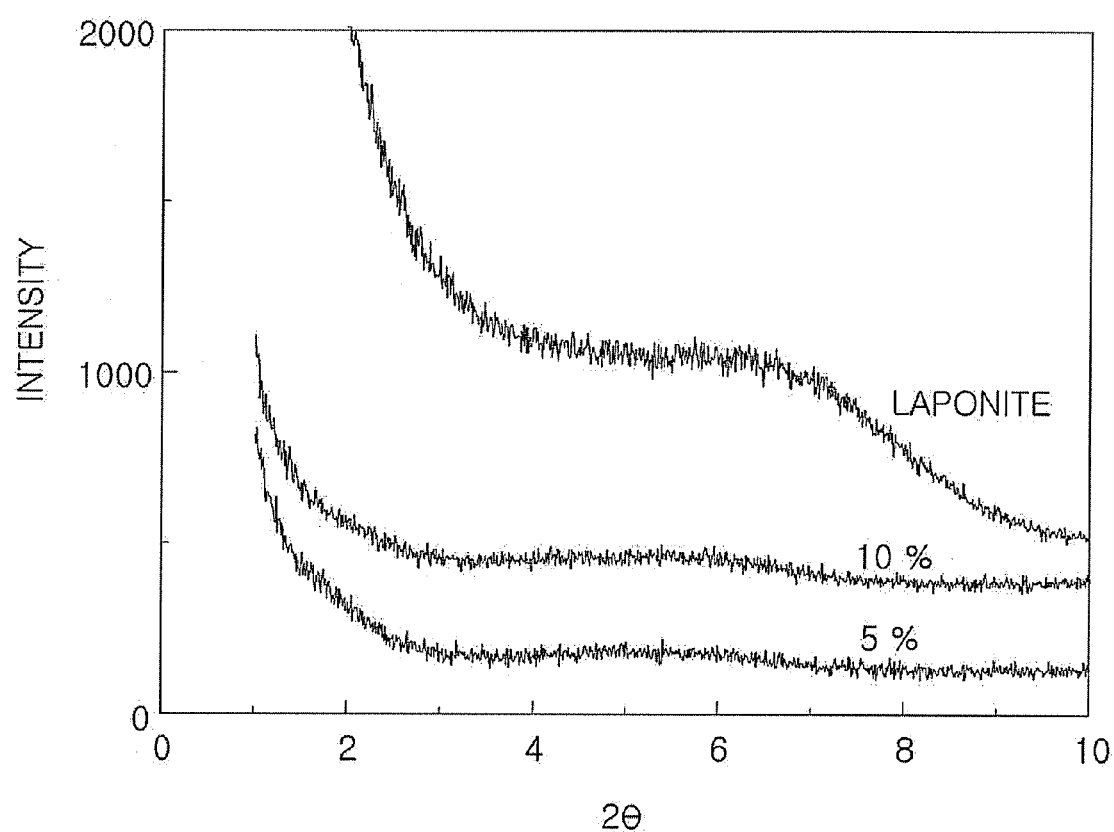
FIG. 7 is a graph illustrating X-ray pattern of a clay nanocomposite prepared according to Method 2.

FIG. 6 is a graph illustrating X-ray patterns of the clay nanocomposite prepared according to Method 1. FIG. 7 is a graph illustrating X-ray patterns of the clay nanocomposite prepared according to Method 2.

TABLE 7

| Sample No. | Molar Ratio of S-DCDPS/DABPA | Amount of Clay (wt %) | Method | Position of peak |
|---|---|---|---|---|
| Example 17 | 30/25 | 10 | Method 1 | Exfoliated structure |
| Example 18 | 30/25 | 40 | Method 1 | 5 |
| Example 19 | 30/25 | 75 | Method 1 | 4.5 |
| Example 20 | 30/25 | 100 | Method 1 | 4.5 |
| Example 21 | 30/25 | 0.1 | Method 2 | Exfoliated structure |
| Example 22 | 30/25 | 5 | Method 2 | Exfoliated structure |
| Example 23 | 30/25 | 10 | Method 2 | Exfoliated structure |

TABLE 8

| Sample No. | Molar Ratio of S-DCDPS/DABPA | Amount of Clay (wt %) | T (Wet) (μm) | Transmittance ($cm^2/s$) | Ratio |
|---|---|---|---|---|---|
| Example 21 | 30/25 | 0.1 | 45 | $2.90 \times 10^{-7}$ | 65% |
| Example 22 | 30/25 | 5 | 45 | $2.77 \times 10^{-7}$ | 62% |
| Comparative Example 2 | NAFION115 | — | 140 | $1.38 \times 10^{-6}$ | 100% |

In Table 8, the term "ratio" indicates a ratio of a monomer.

TABLE 9

| Sample No. | Molar Ratio of S-DCDPS/DABPA | T (Wet) (μm) | Area (1 $cm^2$) | Unit Conductance [$S/cm^2$] |
|---|---|---|---|---|
| Example 21 | 30/25 | 45 | 1 | 8.4 |
| Example 22 | 30/25 | 45 | 1 | 8.2 |
| Comparative Example 2 | NAFION115 | 140 | 1 | 6.7 |

As shown in Table 9, the nanocomposite prepared according to Examples 21 and 22 has lower MeOH permeability (MeOH cross-over) and higher unit conductance than the nanocomposite of Comparative Example 2.

Evaluation of Performance of Example 23: Preparation of Fuel Cell

A coated catalyst membrane (CCM) method was used to prepare membrane electrode assembly (MEA) for a fuel cell. The MEA was prepared by spraying a catalyst directly on a coated catalyst electrode (CCE) and an electrolyte membrane and then attaching a gas diffusion layer to the resultant material.

A method of preparing a cathode and an anode will now be described.

2 g of Pt-black were added to a 20 mL reactor. 1.25 g of a 20 wt % NAFION solution and 3 g of ethylene glycol (EG) were added, and were mixed for 3 minutes by a high speed mixer (Thinky) to prepare a slurry for forming a cathode catalyst layer. Such a mixing operation was performed three times in order to uniformly prepare the slurry.

2 g of PtRu-black was added to 20 mL reactor. 1.25 g of a 20 wt % NAFION solution and 3 g of ethylene glycol (EG) were added, and were mixed for 3 minutes by a high speed mixer (Thinky) to prepare a slurry for forming an anode. Such a mixing operation was performed three times in order to uniformly prepare the slurry.

On a flat glass plate, a poly(tetrafluoroethylene)(PTFE) film that is a support film for a transfer film was positioned on a bar-coater, and then a polyethylene film (thickness: 110 μm) that is a mask for patterning the cathode catalyst layer covered a predetermined portion of an upper surface of the PTFE film. The slurry for forming the cathode catalyst layer was divided and poured two times onto the resultant material, and then the bar-coater was slowly moved. Thus, the uniform cathode catalyst layer was prepared on the support film for the transfer film that is covered by the mask. The resultant structure was dried in a vacuum oven for 24 hours at 120° C., thereby completing the preparation of the transfer film for forming the cathode catalyst layer.

In addition, on a flat glass plate, a poly(tetrafluoroethylene) (PTFE) film that is a support film for a transfer film was positioned on a bar-coater, and then a polyethylene film (thickness: 110 μm) that is a mask for patterning the anode catalyst layer covered a predetermined portion of an upper surface of the PTFE film. The slurry for forming the anode catalyst layer was divided and poured two times onto the resultant material, and then the bar-coater was slowly moved. Thus, the uniform anode catalyst layer was prepared on the support film for the transfer film that is covered by the mask. The resultant structure was dried in a vacuum oven for 24 hours at 120° C., thereby completing the preparation of the transfer film for forming the anode catalyst layer.

The transfer film for forming of the cathode catalyst layer and the transfer film for forming the anode catalyst layer, which were prepared as described above, were disposed on both surfaces of a clay-sulfonated poly(arylene sulfone) nanocomposite electrolyte membrane that was previously prepared. The anode catalyst layer and the cathode catalyst layer were transferred onto the clay-sulfonated polysulfone nanocomposite electrolyte membrane under conditions of 150° C., 5 ton/cm$^2$ for 20 minutes. Then, the support films were separated and removed from the anode catalyst layer and the cathode catalyst layer, respectively. Thus, a coated catalyst membrane (CCM) was obtained. In the coated catalyst membrane (CCM), the amount of catalyst loading of Pt-black of the cathode was about 4.8 mg/cm$^2$, and the amount of catalyst loading of PtRu-black of anode was about 4.3 mg/cm$^2$.

A cathode diffusion layer and a backing layer were stacked on a surface of the CCM, and another cathode diffusion layer and another backing layer were stacked on another surface of the CCM. Then, hot-press was performed to the resultant structures, thereby completing the preparation of the MEA.

In the MEA, 1M methanol as a fuel was supplied to the anode, and air was supplied to the cathode. The fuel cell was operated at a temperature of 60° C.

COMPARATIVE EXAMPLE 3

MEA was prepared according to the same manner as in Example 23 except that an electrolyte membrane of NAFION 115 (Comparative Example 2 of Table 5) was used instead of a polysulfone nanocomposite electrolyte membrane including the sulfonated poly(arylene sulfone) represented by Formula 3.

Figure 5:
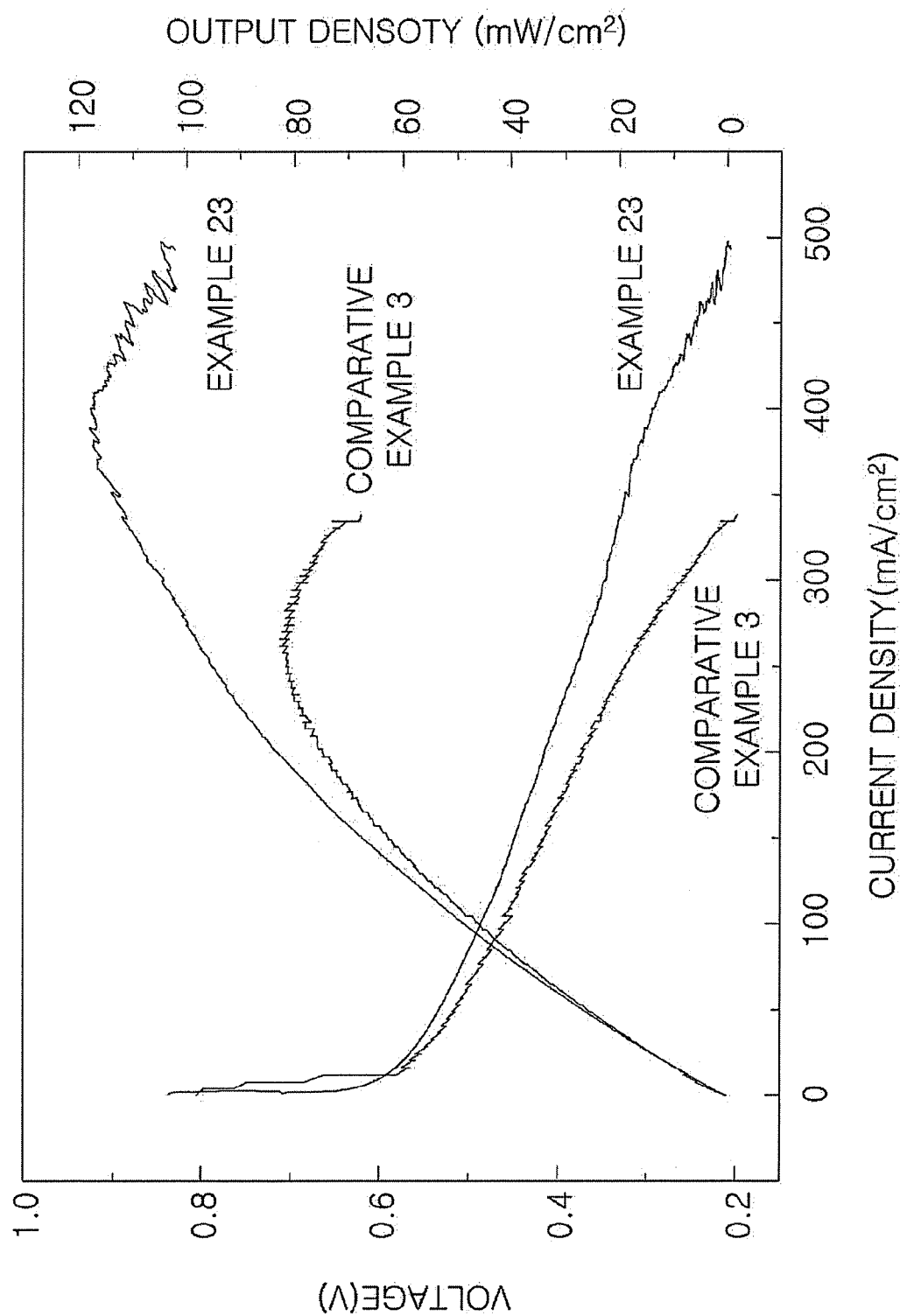
FIG. 5 is graph illustrating cell voltages and output densities of the fuel cells, prepared according to Example 23 and Comparative Example 3, with respect to the current density of a fuel cell.

Cell voltages and output densities of the fuel cells prepared according to Example 23 and Comparative Example 3 with respect to current density of the fuel cell were measured. The results are shown in FIG. 5. The MEA of the fuel cell used in the measurement was prepared by manufacturing a catalyst-coated membrane (CCM), attaching gas diffusion layer to both surfaces of the CCM, and pressing the resultant structure. Direct methanol fuel cell (DMFC) operated under an condition in which 2.5 times (2.5 stoich) of 1M MeOH aqueous solution that is a fuel of an anode and air that is fuel of a cathode than a theoretical value were provided at 60° C.

Referring to FIG. 5, the fuel cell of Example 1 showed a higher performance than the fuel cell of Comparative Example 1, and thus the fuel cell of Example 1 exhibited higher ion conductance and lower methanol crossover than the fuel cell of Comparative Example 1.

As described above, according to the one or more of the above embodiments, sulfonated poly(arylene sulfone), a cross-linked material thereof, a clay nanocomposite using the sulfonated poly(arylene sulfone) or the cross-linked material may have a low glass transition temperature, and excellent brittleness and solubility resistance. Thus, when an electrolyte membrane is formed of these materials, excellent mechanical strength and ion conductance may be obtained, and fuel crossover towards a cathode may be more impeded. Thus, a fuel cell including the electrolyte membrane has high operation efficiency and a long lifetime.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A sulfonated poly(arylene sulfone) comprising a first repeating unit represented by Formula 1A below, a second repeating unit represented by Formula 1B below, a third repeating unit represented by Formula 1C below, and a fourth repeating unit represented by Formula 1D below:

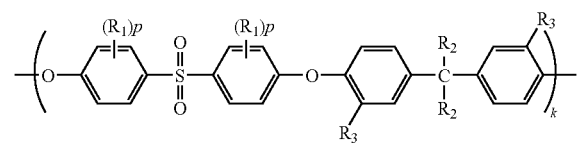

[Formula 1A]

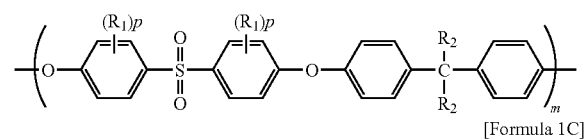

[Formula 1B]

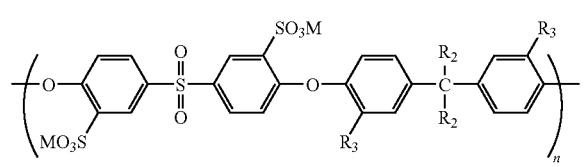

[Formula 1C]

-continued

[Formula 1D]

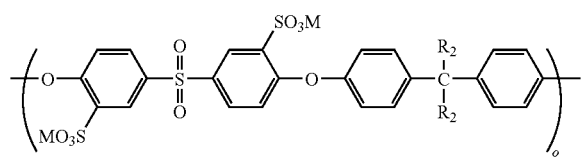

where $R_1$s are the same as or different from each other, and are a C1-C10 alkyl group, a C2-C10 alkenyl group, a phenyl group, or a nitro group, p is an integer in the range of 0 to 4, $R_2$ is hydrogen, a methyl group or an ethyl group, $R_3$ is a C2-C10 alkenyl group, M is Na, K, or H, and k is in the range of about 0.1 to about 0.9 mole, m is in the range of about 0.1 to about 0.9 mole, and the sum of n and o is in the range of about 0.1 to about 0.5 mole.

2. The sulfonated poly(arylene sulfone) of claim 1, wherein a polymerization degree of the sulfonated poly(arylene sulfone) is in the range of about 5 to about 3,500.

3. The sulfonated poly(arylene sulfone) of claim 1, wherein n is in the range of about 0.01 to about 0.3 mole, and o is in the range of about 0.2 to about 0.49 mole.

4. The sulfonated poly(arylene sulfone) of claim 1, wherein the sulfonated poly(arylene sulfone) is represented by Formula 2 below:

[Formula 1A]

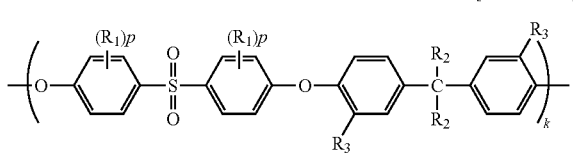

[Formula 1B]

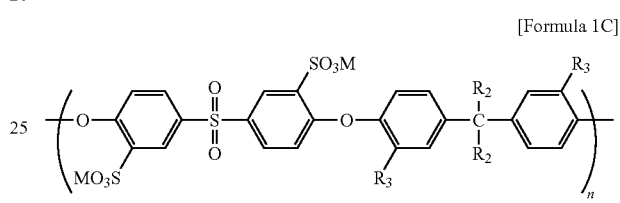

[Formula 1C]

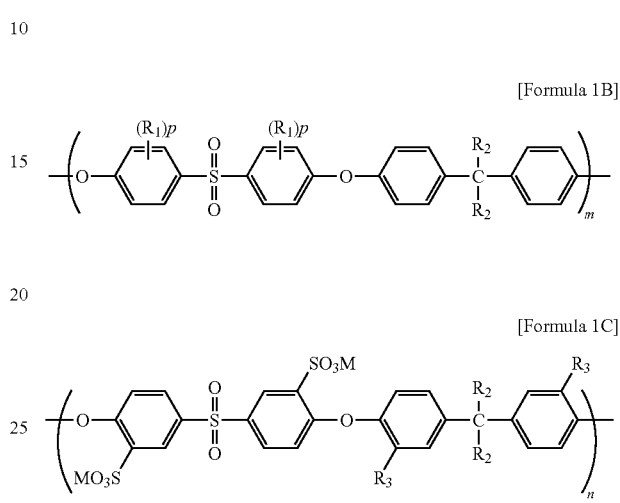

[Formula 2]

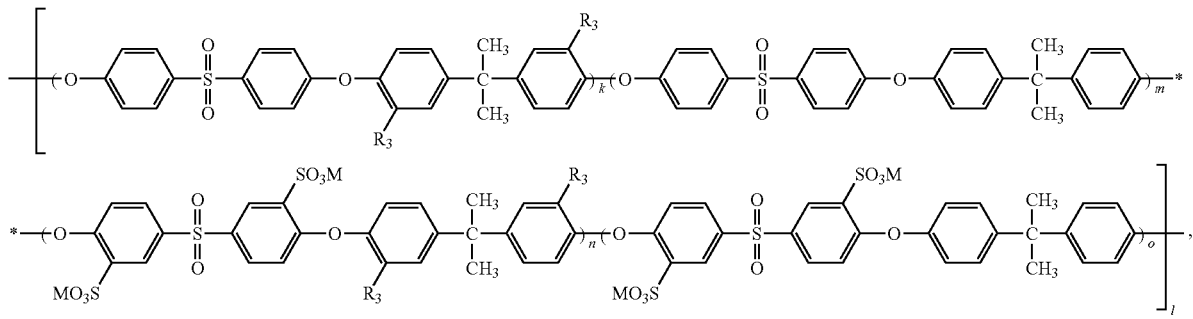

where k is in the range of about 0.1 to about 0.5 mole, m is in the range of about 0.1 to about 0.5 mole, the sum of n and o is in the range of about 0.2 to about 0.5, and l is an integer in the range of 5 to 3,500.

5. The sulfonated poly(arylene sulfone) of claim 1, wherein a mixing molar ratio of k and m is in the range of about 1:9 to about 5:5.

6. The sulfonated poly(arylene sulfone) of claim 1, wherein a sulfonation degree of the sulfonated poly(arylene sulfone) is in the range of about 10 to about 50%.

7. A cross-linked sulfonated poly(arylene sulfone) that is a product of a cross-linking reaction of the sulfonated poly(arylene sulfone) comprising a first repeating unit represented by Formula 1A below, a second repeating unit represented by Formula 1B below, a third repeating unit represented by Formula 1C below, and a fourth repeating unit represented by Formula 1D below:

-continued

[Formula 1D]

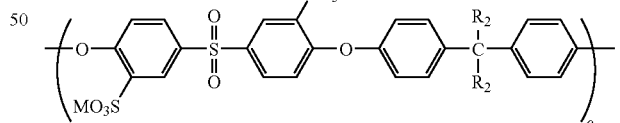

where $R_1$s are the same as or different from each other, and are a C1-C10 alkyl group, a C2-C10 alkenyl group, a phenyl group, or a nitro group, p is an integer in the range of 0 to 4, $R_2$ is hydrogen, a methyl group or an ethyl group, $R_3$ is a C2-C10 alkenyl group, M is Na, K, or H, and k is in the range of about 0.1 to about 0.9 mole, m is in the range of about 0.1 to about 0.9 mole, and the sum of n and o is in the range of about 0.1 to about 0.5 mole.

8. The cross-linked sulfonated poly(arylene sulfone) of claim 7, wherein a polymerization degree of the sulfonated poly(arylene sulfone) is in the range of about 5 to about 3,500.

9. The cross-linked sulfonated poly(arylene sulfone) of claim 7, wherein n is in the range of about 0.01 to about 0.3 mole, and o is in the range of about 0.2 to about 0.49 mole.

10. The cross-linked sulfonated poly(arylene sulfone) of claim 7, wherein the product of the cross-lining reaction of the sulfonated poly(arylene sulfone) is obtained by a cross-linking reaction between molecules of sulfonated poly(arylene sulfone), or a cross-linking reaction between a molecule of sulfonated poly(arylene sulfone) and a polyfunctional compound.

11. The cross-linked sulfonated poly(arylene sulfone) of claim 10, wherein the polyfunctional compound is at least one selected from the group consisting of bisphenol A ethoxylate diacrylate, triethyleneglycol divinylether, hexanedioldiacrylate, and mixtures thereof.

12. The cross-linked sulfonated poly(arylene sulfone) of claim 10, wherein an amount of the polyfunctional compound is in the range of about 5 to about 50 parts by weight based on 100 parts by weight of the sulfonated poly(arylene sulfone).

13. The cross-linked sulfonated poly(arylene sulfone) of claim 7, wherein a mixing molar ratio k and m is in the range of about 1:9 to about 5:5.

14. The cross-linked sulfonated poly(arylene sulfone) of claim 7, wherein a sulfonation degree of the sulfonated poly(arylene sulfone) is in the range of about 10 to about 50%.

15. A clay-sulfonated poly(arylene sulfone) nanocomposite comprising:
the sulfonated poly(arylene sulfone) of claim 1; and
an unmodified clay.

16. The clay-sulfonated poly(arylene sulfone) nanocomposite of claim 15, wherein the sulfonated poly(arylene sulfone) is represented by Formula 2 below:

where k is in the range of about 0.1 to about 0.5 mole, m is in the range of about 0.1 to about 0.5 mole, the sum of n and o is in the range of about 0.2 to about 0.5, and l is an integer in the range of 5 to 3500.

17. A clay-sulfonated poly(arylene sulfone) nanocomposite comprising:
the cross-linked sulfonated poly(arylene sulfone) of claim 7; and
an unmodified clay.

18. The clay-sulfonated poly(arylene sulfone) nanocomposite of claim 15, wherein the polyfunctional compound is at least one selected from the group consisting of bisphenol A ethoxylate diacrylate, triethyleneglycol divinylether, hexanedioldiacrylate, and mixtures thereof.

19. A fuel cell comprising:
a cathode;
an anode; and
an electrolyte membrane interposed between the cathode and the anode,
wherein the electrolyte membrane comprises the sulfonated poly(arylene sulfone) of claim 1.

20. A fuel cell comprising:
a cathode;
an anode; and
an electrolyte membrane interposed between the cathode and the anode,
wherein the electrolyte membrane comprises the cross-linked sulfonated poly(arylene sulfone) of claim 7.

21. A fuel cell comprising:
a cathode;
an anode; and
an electrolyte membrane interposed between the cathode and the anode,
wherein the electrolyte membrane comprises the clay-sulfonated poly(arylene sulfone) nanocomposite of claim 15.

[Formula 2]

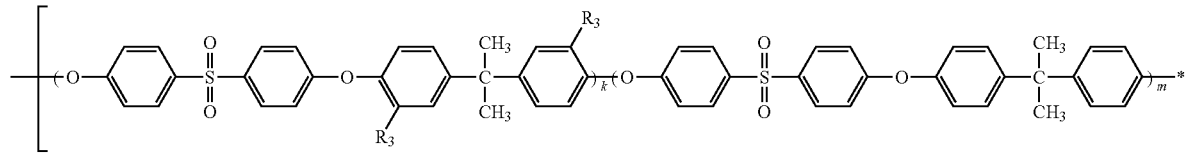

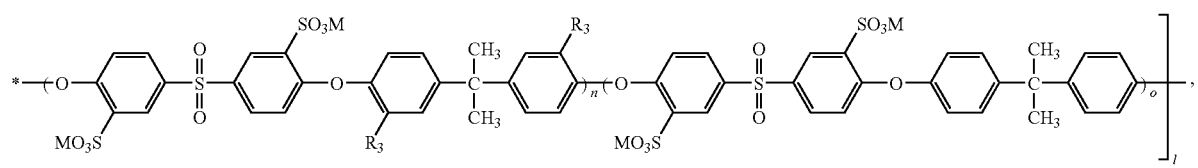

22. A fuel cell comprising:
a cathode;
an anode; and
an electrolyte membrane interposed between the cathode and the anode,
wherein the electrolyte membrane comprises the clay-sulfonated poly(arylene sulfone) nanocomposite of claim 17.

* * * * *

UNITED STATES PATENT AND TRADEMARK OFFICE
CERTIFICATE OF CORRECTION

PATENT NO. : 8,211,588 B2
APPLICATION NO. : 12/651599
DATED : July 3, 2012
INVENTOR(S) : Yeong-Suk Choi et al.

Page 1 of 1

It is certified that error appears in the above-identified patent and that said Letters Patent is hereby corrected as shown below:

Column 27, claim 10, line 8, change "cross-lining" to --cross-linking--.

Signed and Sealed this
Fifteenth Day of January, 2013

David J. Kappos
*Director of the United States Patent and Trademark Office*